United States Patent
Mimura

[19]

[11] Patent Number: 6,148,978
[45] Date of Patent: Nov. 21, 2000

[54] FRICTION RESISTANCE GENERATOR

[76] Inventor: Kenji Mimura, 29-1105, Wakabadai 4-chome, Asahi-ku, Yokohama-shi, Kanagawa 24-0801, Japan

[21] Appl. No.: 09/256,512

[22] Filed: Feb. 22, 1999

[30] Foreign Application Priority Data

Dec. 22, 1998 [JP] Japan .................................. 10-364487

[51] Int. Cl.[7] .............................................. F16D 41/064
[52] U.S. Cl. .............................................. 192/45; 188/83
[58] Field of Search ................... 192/45, 38; 188/82.84, 188/83; 384/450, 571

[56] References Cited

U.S. PATENT DOCUMENTS

| | | | |
|---|---|---|---|
| 1,670,197 | 5/1928 | Humfrey | 192/45 |
| 3,557,921 | 1/1971 | Takada | 192/45 |
| 5,035,309 | 7/1991 | Takada | 192/45 |
| 5,067,601 | 11/1991 | Castens | 192/45 |
| 5,211,273 | 5/1993 | Castens | 192/45 |
| 5,328,012 | 7/1994 | Takada | 192/45 |
| 5,381,879 | 1/1995 | Takada | 192/45 |
| 5,411,218 | 5/1995 | Uehara et al. | 192/45 X |
| 5,720,371 | 2/1998 | Kimura et al. | 192/45 X |

FOREIGN PATENT DOCUMENTS

2801153  7/1998  Japan .

*Primary Examiner*—Richard M. Lorence
*Attorney, Agent, or Firm*—Lowe Hauptman Gopstein Gilman & Berner

[57] ABSTRACT

The present invention provides a friction resistance generator which can more effectively generate a stable friction resistance. More specifically, according to the present invention, in the configuration where a rotor and a passive member face each other in a radial direction through a plurality of rollers, a rolling axis of each roller is made to be in a range larger than an angle of 5° and smaller than an angle of 20° with respect to a rotational axis of the rotor, and the rolling axis of each roller is made to be in a range larger than an angle of 25° and smaller than an angle of 90° with respect to a plane including the rotational axis of the rotor. Thereby it is possible to always generate an effective and stable frictional force.

8 Claims, 9 Drawing Sheets

FIG. 15

FRICTION RESISTANCE GENERATOR

BACKGROUND OF THE INVENTION

1. Field of the Invention

The present invention relates to a friction resistance generator which is used as a mechanism for applying an arbitrary resistance by a frictional force to a rotational motion of various machines.

2. Description of the Related Art

In general, bearings are well known as one type of machine element. The bearings are largely classified into a sliding bearing which supports a movable member via a lubricating oil, and a rolling bearing which supports the movable member via a ball and a roller. These bearings are used for always smoothly moving the movable member, and their object is to reduce frictional resistance between members. Therefore, conventional bearings are not structured so as to control the power transferred between moving members by applying a resistance to moving members. Accordingly, when it is desired in order to restrict a kinetic velocity of the movable member to a prescribed velocity, a damping device such as a shock absorber and a damper needs to be separately added.

By the way, in the sliding bearing using a lubricating oil, if the lubricating oil is interposed between members in an ideal state, the frictional resistance can be extremely reduced. However, an oil film between two surfaces mutually sliding is lost in a low velocity state and in a high load state. As a result, a static friction and a kinetic friction intermittently act, and then, a frictional force becomes extremely unstable. For this reason, there is a problem that a so-called stick slip phenomenon can often occur.

Taking the aforesaid problem into consideration, the applicant has proposed a friction resistance generator disclosed in Japanese Patent No. 2801153, which can restrict a kinetic velocity to a prescribed velocity without adding a specific mechanism, and always generates a stable resistance so as to readily control the resistance.

In the friction resistance generator, a plurality of rollers are interposed between a rotor and a passive member which are arranged facing each other in a radial direction, and a rolling axis of each roller is inclined so as to make a prescribed angle with respect to a plane including a rotational axis of the rotor. By doing so, a load of an axial direction is applied to the rotor and the passive member, and then, when the rotor and the passive member is rotated while contacting with each roller, a sliding friction is generated while each roller is rolling, and thus, an arbitrary frictional resistance is generated with respect to a rotational motion of the rotor.

SUMMARY OF THE INVENTION

The present invention relates to an improvement in the aforesaid friction resistance generator. It is an object of the present invention to provide a friction resistance generator which can effectively generate a stable frictional resistance.

To achieve the above object, according to a first aspect, the present invention provides a friction resistance generator comprising:

a rotor rotating on the center of an axis thereof;

a plurality of rollers arranged along a rotational raceway track of the rotor;

a passive member facing the rotor in a radial direction of the rotor through the respective rollers; and a retainer holding the respective rollers arranged at intervals so that the rollers freely roll, wherein rolling axes of the respective rollers are inclined so as to form a prescribed first inclination angle with respect to a rotational axis of the rotor, and the inclination angle is set to a range larger than 5° and smaller than 20°, and the rolling axes of the rollers are inclined to the identical direction respectively so as to form a second prescribed angle to a plane including the rotational axis of the rotor, and the second inclination angle is set to a range larger than 25° and smaller than 90°.

With the above construction, when a load in the axial direction is applied to the rotor, and the rotor is rotated while contacting with the respective rollers; the respective rollers roll along the rotational raceway track of the rotor while the retainer is restricting rotational motions of the rollers which are rolling to a direction inclined to the rotational raceway track of the rotor. As a result, a frictional force is generated between the respective rollers and the rotor. At this time, when the rotor is rotated in one direction, the respective rollers roll in one axial direction of the rotor. On the other hand, when the rotor is rotated to the other direction, the respective rollers rolls in the other axial direction of the rotor. Therefore, different frictional forces are generated depending upon a rotational direction of the rotor. In this case, each rolling axis of the rollers is made to be in a range larger than 5° and smaller than 20° with respect to the rotational axis of the rotor, and each rolling axis of the rollers is made to be in a range larger than 25° and smaller than 90° with respect to the plane including the rotational axis of the rotor. Thereby an effective and stable frictional force is always generated.

Further, according to a second aspect, the present invention provides a friction resistance generator comprising:

a rotor rotating on the center of an axis thereof;

a plurality of rollers arranged along a rotational raceway track of the rotor;

a passive member facing the rotor in a radial direction of the rotor through the respective rollers; and a retainer holding the respective rollers arranged at intervals so that the rollers freely roll, wherein rolling axes of the rollers are inclined so as to form a prescribed angle with respect to a rotational axis of the rotor, and a first inclination angle which is set to a range larger than 3° and smaller than 20°, and the rolling axes of the rollers are inclined in a reverse direction every prescribed number respectively so as to form a second prescribed angle to a plane including the rotational axis of the rotor, and the second inclination angle is set to a range larger than 25° and smaller than 90°.

With the above construction, when a load of the axial direction is applied to the rotor, and the rotor is rotated while contacting with the respective rollers; the respective rollers roll along the rotational raceway track of the rotor while the retainer is restricting rotational motions of the rollers which are rolling to a direction inclined to the rotational raceway track of the rotor. As a result, a frictional force is generated between the respective rollers and the rotor. At this time, when the rotor is rotated, some rollers, which are inclined in an identical direction, tend to roll in one axial direction of the rotor, while the other rollers, which are inclined in the other direction, tend to roll in the other axial direction of the rotor. Therefore, according to the number of rollers which are inclined in opposite directions to each other, it is possible to arbitrarily set magnitude of frictional force in each rotational direction of the rotor. In this case, each rolling axis of the rollers is made set to be in a range larger than 3° and smaller than 20° with respect to the rotational axis of the rotor, and each rolling axis of the rollers is made to be in a range larger than 25° and smaller than 90° with respect to the plane including the rotational axis of the rotor. Thereby an effective and stable frictional force is always generated.

Thus, the friction resistance generator according to the first and second aspects is effectively applicable to a clutch, a braking device or the like, and has a simple structure, so that it is possible to achieve cost reduction and size reduction. In this case, according to the second aspect, it is possible to arbitrarily set magnitude of frictional force in each rotational direction of the rotor, so that the friction resistance generator is applicable to a wide range in accordance with the usage.

Further, according to the second aspect, the rollers inclined in opposite directions with respect to the plane including the rotational axis of the rotor, are alternately arranged in a circumferential direction of the rotor every the same number. Thus, even in the case where the rotor is rotated in any directions, an equal frictional force is generated. Therefore, in the case where it is an object to obtain an operation as described above, the second aspect is very advantageous, since an equal frictional force is generated no matter which directions the rotor is rotated in.

Further, according to the second aspect, the rollers inclined in opposite directions with respect to the plane including the rotational axis of the rotor are alternately arranged every different number in a circumferential direction of the rotor, and rollers positioned at equal intervals on at least three locations of the rotor in a circumferential direction of the rotor are inclined in the opposite direction to the other rollers. Thus, different frictional forces are generated depending upon the rotational directions of the rotor. Accordingly, in the case where it is an object to obtain an operation as described above, this is very advantageous. In this case, the rotor is always rotated in a stable state, so that it is possible to enhance reliability for practical use.

Further, according to the first and second aspects, each surface of the rotor and the passive member contacting with the respective rollers are formed in a convex shape with respect to each outer peripheral surface of the rollers in a cross section including the rolling axis of the roller. Thus, it is possible to reduce contact pressures on both ends of the roller in the axial direction. Furthermore, according to the first and second aspects, each outer peripheral surface of the roller contacting with the rotor and the passive member is formed in a convex shape with respect to each contact surface of the rotor and the passive member in a cross section including the rolling axis of the roller. Thus, it is possible to reduce a contact pressure on both end sides of the roller in the axial direction. Whereby it is possible to reduce contact pressures on both ends of the roller contacting with the rotor and the passive member in the axial direction, so that uneven wear of the roller can be reduced, and also, durability can be improved.

DETAILED DESCRIPTION OF THE PREFERRED EMBODIMENTS

FIG. 1 to FIG. 7 show a first embodiment of the present invention.

Figure 1:
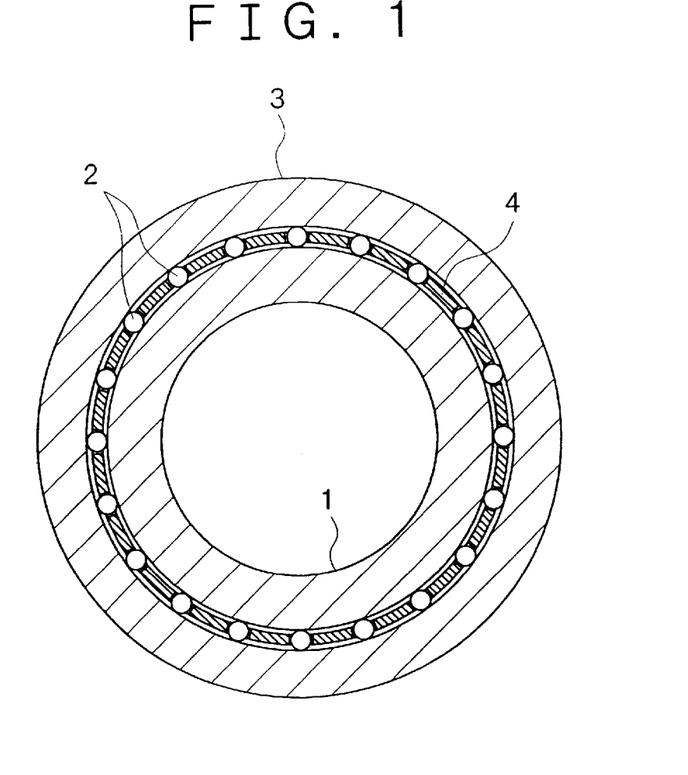
FIG. 1 is a front cross-sectional view showing a friction resistance generator according to a first embodiment of the present invention.

A friction resistance generator of the first embodiment comprises a rotor 1 which rotates on the center of its axis, a plurality of rollers 2 which are arranged along a rotational raceway track of the rotor 1, a passive member 3 which faces the rotor 1 via the respective rollers 2 in a radial direction, and a cage 4 which holds the respective rollers at intervals so that the rollers freely roll. These are the least components required for constituting the friction resistance generator, and in fact, the rotor 1 and the passive member 3 are connected respectively to other transmitting members.

Figure 2:
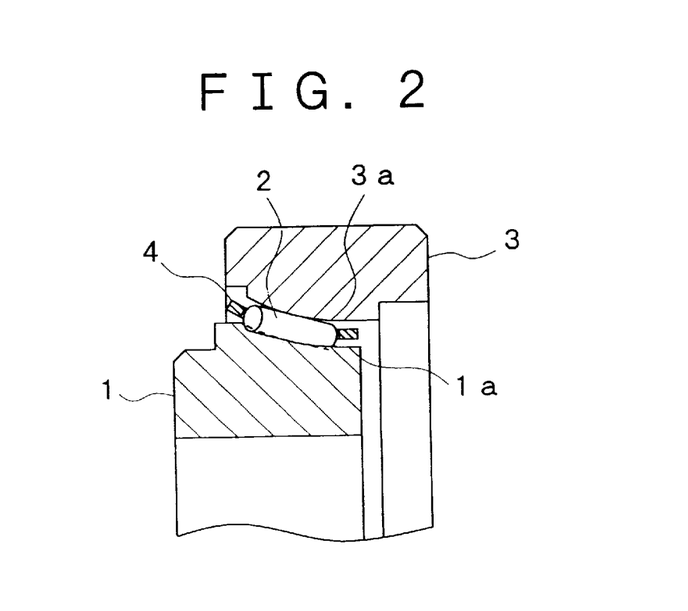
FIG. 2 is a side sectional view showing a principal portion of the friction resistance generator.

The rotor 1 is formed into an annular shape around a rotational axis thereof, and is formed with an inner raceway surface 1a, which faces the passive member 3, on the outer peripheral surface. The inner raceway surface 1a has a taper shape around the rotational axis of the rotor 1, and is formed in a concave curved line in a cross section parallel with the rotational axis of the rotor 1 as shown in FIG. 2.

Each roller 2 has a cylindrical shape such that an outer peripheral surface uniformly extends in an axial direction, and the respective rollers 2 are arranged at equal intervals in a circumferential direction of the rotor 1.

The passive member 3 is formed into an annular shape around the rotational axis of the rotor 1, and is formed with an outer raceway surface 3a which faces the rotor 1 on the inner peripheral surface. The outer raceway surface 3a has a taper shape around the rotational axis of the rotor 1, and is formed in a convex curved line in a cross section parallel with the rotational axis of the rotor 1 as shown in FIG. 2.

Figure 3:
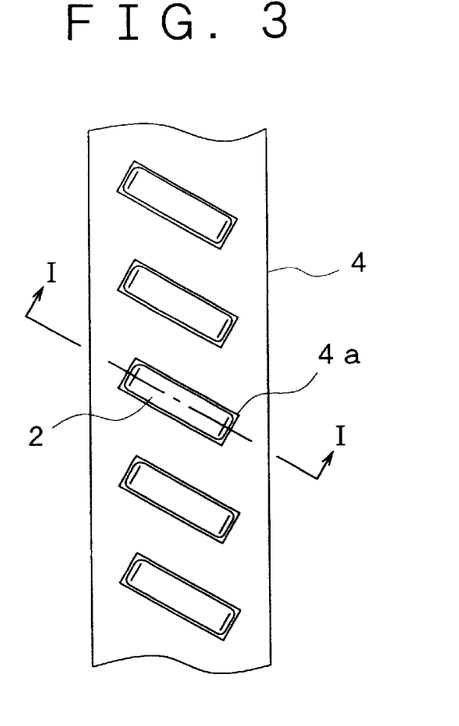
FIG. 3 is a development view of rollers and a cage.

The cage 4 is formed into an annular shape around the rotational axis of the rotor 1, and has a taper shape curved along raceway surfaces 1a and 3a, and has a thickness smaller than an outer diameter of each roller 2. Further, the cage 4 is provided with a plurality of holes 4a for housing the respective rollers 2 so that the rollers 2 freely roll, and these holes 4a are arranged at equal intervals in a circumferential direction of the cage 4. Further, as shown in FIG. 3, these holes 4a are formed so that rolling axes of the respective rollers 2 are inclined to the identical direction. Incidentally, in FIG. 3, a clearance between each hole 4a of the cage 4 and each roller 2 is illustrated larger; however, actually, the clearance is formed in an extremely small size so that an inclination angle of the roller 2 is unchanged.

Figure 4A:
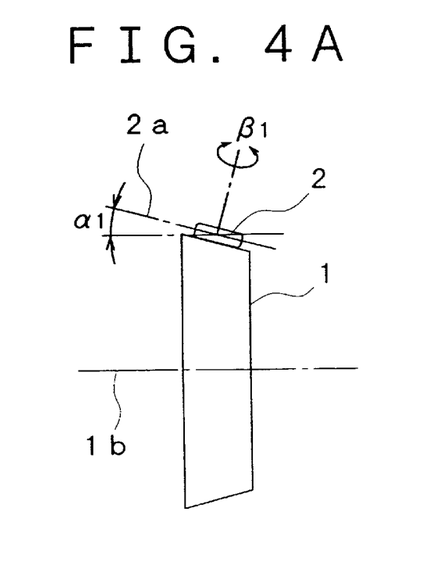
FIGS. 4A and 4B are schematic views showing an inclination angle of the roller.
Figure 4B:
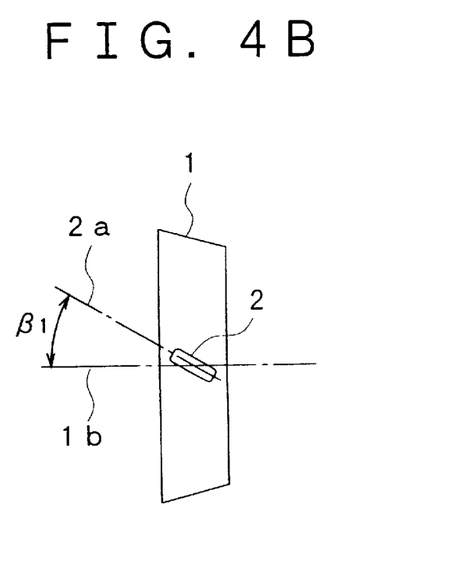

As shown in FIG. 4A, a rolling axis 2a of each roller 2 has a prescribed inclination angle α1 to a rotational axis 1b of the rotor 1. Further, as shown in FIG. 4B, the rolling axis 2a of each roller 2 has a prescribed inclination angle β1 to a plane including the rotational axis 1b of the rotor 1. In this case, the inclination angle α1 of each roller 2 is set larger than 5° and smaller than 20°, while, the inclination angle β1 is set larger than an angle of 25° and smaller than 90°. Also, the inclination angle β1 is an angle in a case of viewing from a direction perpendicular to the rolling axis 2a of the roller 2.

Figure 5A:
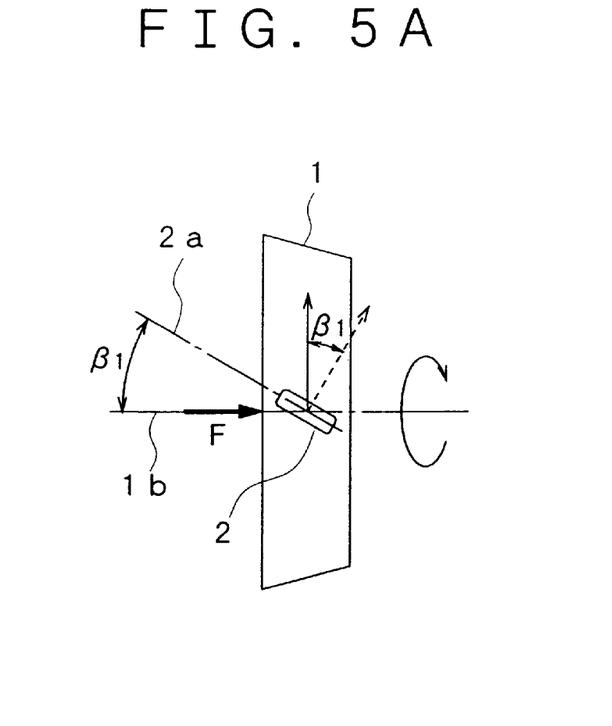
FIG. 5A and FIG. 5B are views to explain an operation of the friction resistance generator.
Figure 5B:
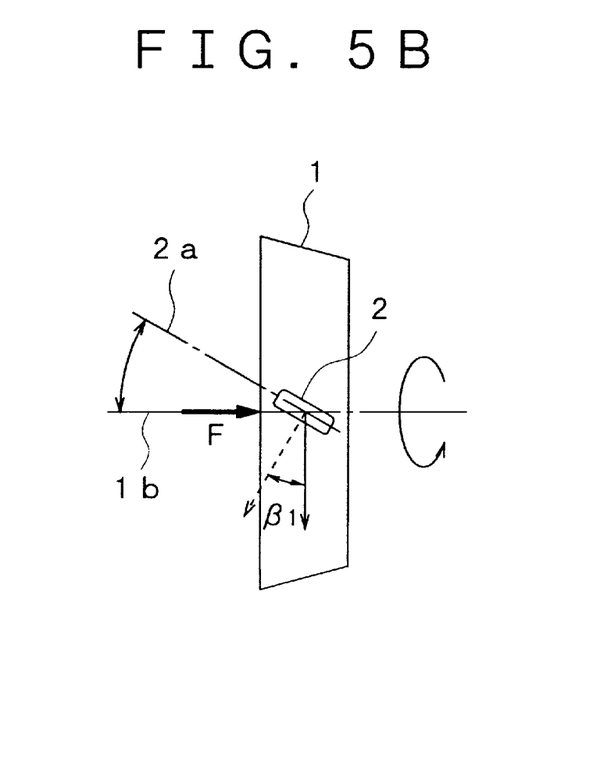

In the friction resistance generator thus constructed, as shown in FIGS. 5A and 5B, when the rotor 1 is rotated in a state that a load F of an axial direction is applied to the rotor 1, the respective rollers 2 roll while contacting with the rotor 1 and the passive member 3, and also, the cage 4 is rotated to follow the rotation. At this time, as shown in FIG. 5A, when the rotor 1 is rotated in one direction (hereinafter, referred to as a forward rotation), each roller 2 rolls along the rotational raceway track of the rotor 1 as shown by a solid line arrow of FIG. 5A while the cage 4 is restricting a rotational motion of the roller 2 which is rolling in one axial direction of the rotor 1, that is, a direction inclined by the angle β1 to the rotational raceway track as shown by a broken line arrow of FIG. 5A (direction in which a diameter of the rotor 1 decreases). As a result, a frictional force proportional to the load F in the axial direction is generated among each roller 2, the rotor 1 and the passive member 3. Further, as shown in FIG. 5B, when the rotor 1 is rotated in the other direction (hereinafter, referred to as a reverse rotation), each roller 2 rolls along the rotational raceway track of the rotor 1 as shown by a solid line arrow of FIG. 5B while the cage 4 is restricting a rotational motion of the roller 2 which is rolling in the other axial direction of the rotor 1, that is, a direction inclined by the angle β1 to the rotational raceway track as shown by a broken line arrow of FIG. 5B (direction in which the diameter of the rotor 1 increases). As a result, a frictional force proportional to the load F in the axial direction is generated among each roller 2, the rotor 1 and the passive member 3. At this time, each roller 2 generates a sliding friction while rolling; therefore, a static friction is not generated, so that a stable resistance by a kinetic friction can be always obtained. Even if a static friction is generated in the initial stage, the static friction instantaneously transfers to a kinetic friction by the rotational motion of the roller 2. Moreover, in the forward rotation of the rotor 1, each roller 2 rolls in a direction in which a diameter of the rotor 1 decreases; on the other hand, in the reverse rotation of the rotor 1, each roller 2 rolls to a direction in which the diameter of the rotor 1 increases. Thus, even in the case the load F is equal, frictional forces generated are different in its magnitude depending upon rotational directions of the rotor 1. In this case, a frictional force in the forward rotation becomes larger than a frictional force in the reverse rotation. When the load F in the axial direction of the rotor 1 is released, it is possible to arbitrarily obtain a state that no frictional force is generated.

By the way, the present applicant has confirmed a relationship between inclination angles α1 and β1 and a frictional torque P on the basis of an experiment and theoretical analysis which have been made in a range from 3° to 40° of the inclination angle α1 and in a range from 5° to 85° of the inclination angle β1.

Figure 6:
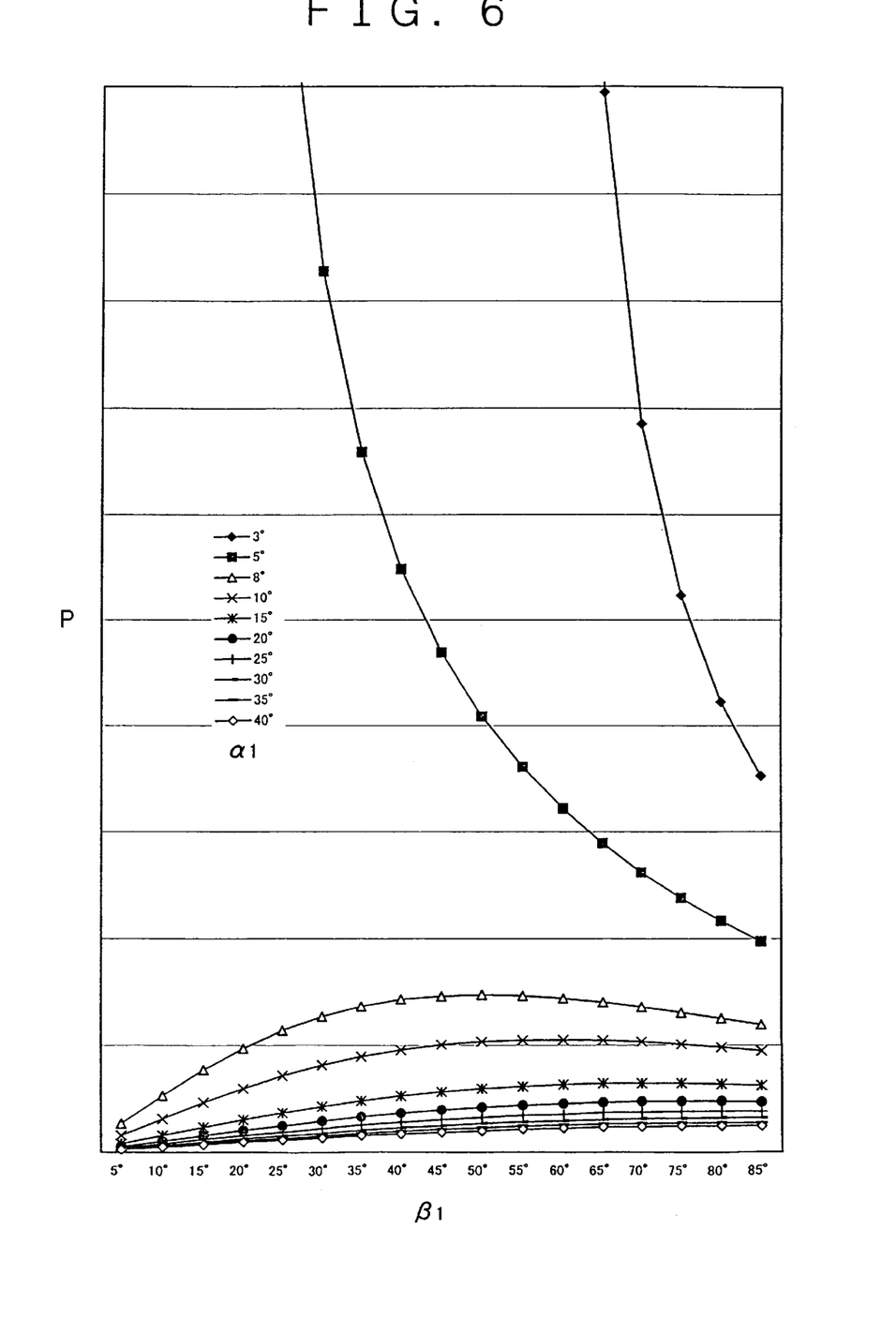
FIG. 6 is a graph showing a relationship between an inclination angle of the roller and a frictional torque.
Figure 7:
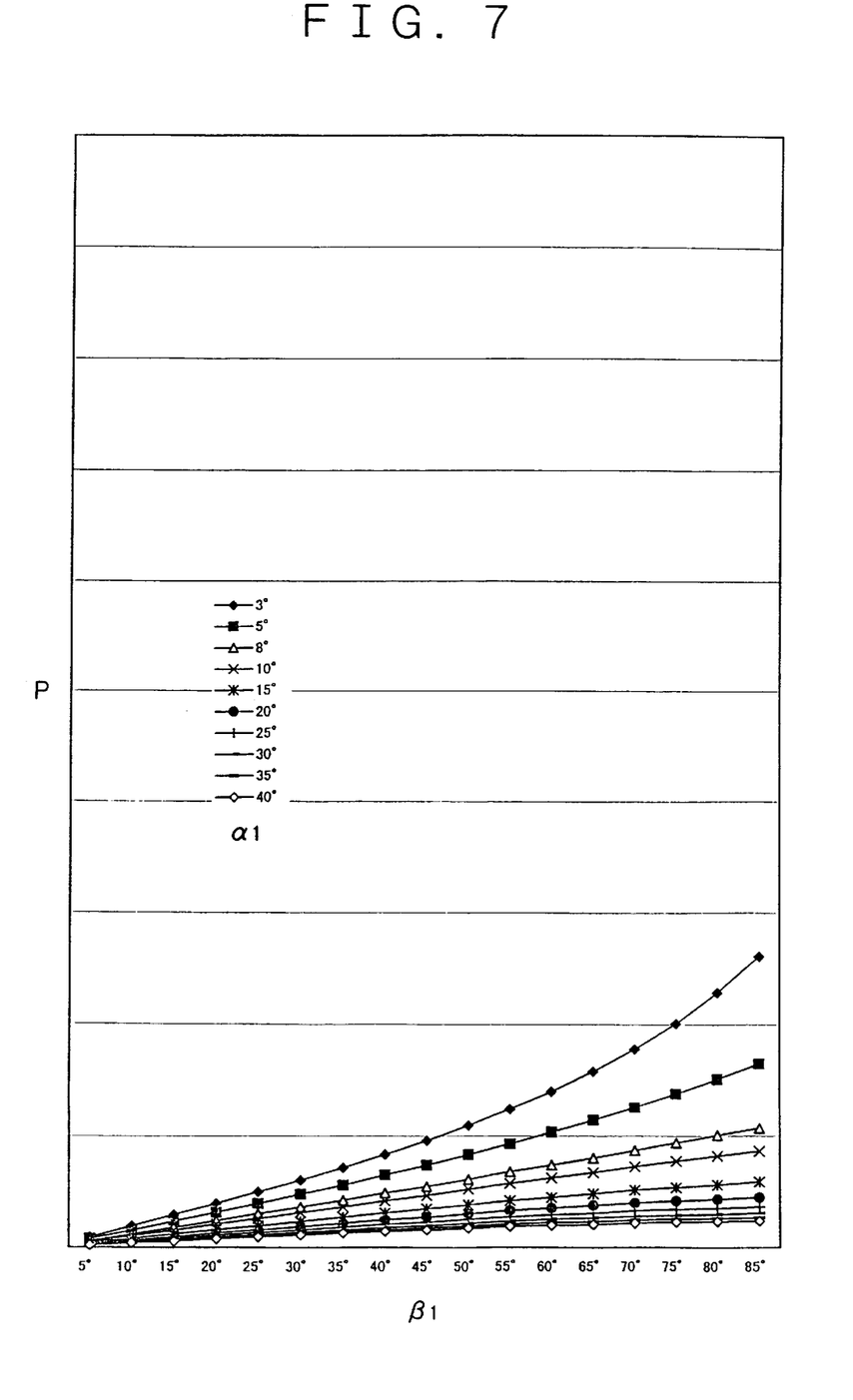
FIG. 7 is a graph showing a relationship between an inclination angle of the roller and a frictional torque.

More specifically, as shown in FIG. 6, in the case where the inclination angle α1 of each roller is 5° or less in the forward rotation of the rotor 1, there appears a characteristic such that in accordance with decrease in the inclination angle β1 the frictional torque P steeply becomes larger, so that the rotor 1 and the passive member 3 become apt to be locked. Further, in the case where the inclination angle α1 of each roller is more than 5°, the frictional torque P does not show steeply variation. However, when the inclination angle α1 of each roller becomes 20° or more, a frictional torque P of a practically effective value or more can not be obtained regardless of magnitude of the inclination angle β1. On the other hand, in the case where the inclination angle β1 of each roller is more than 25°, the frictional torque P does not show steeply variation except the case where the inclination angle α1 of each roller is 5° or less. However, when the inclination angle β1 of each roller becomes 25° or less, the frictional torque P greatly decreases. Accordingly, a frictional torque P of a practically effective value or more can not be obtained. Moreover, as shown in FIG. 7, in the case where the rotor 1 is rotated in the reverse direction, for any case of the inclination angle α1, when the inclination angle β1 become small, there appears a characteristic such that the frictional torque P uniformly decreases. However, when the inclination angle α1 becomes 20° or more, a frictional torque P of a practically effective value or more can not be obtained regardless of magnitude of the inclination angle β1. Further, even in the case where the inclination angle α1 is smaller than 20°, when the inclination angle β1 is 25° or less, a frictional torque P of a practically effective value or more can not be obtained. In addition, though the applicant does not actually confirm the case where the inclination angle β1 is more than 85°, it is presumed according to the above experimental data that a frictional torque P generating at the inclination angle β1 up to 90° becomes generally equal to the case where the inclination angle β1 is 85°.

Therefore, according to the friction resistance generator of this first embodiment, in the configuration wherein the rotor 1 and the passive member 3 face each other in the radial direction via the plurality of rollers 2, the rolling axis of each roller 2 has the inclination angle α1 which is larger than 5° and smaller than 20° with respect to the rotational axis of the rotor 1, and the rolling axis of each roller 2 has the inclination angle β1 which is larger than 25° and smaller than 90° with respect to a plane including the rotational axis of the rotor 1. As a result, it is possible to always generate an effective and stable frictional torque P. Further, since different frictional forces can be generated depending upon a rotational direction of the rotor 1; in the case where it is an object to obtain an operation as described above, this is very advantageous.

Figure 8:
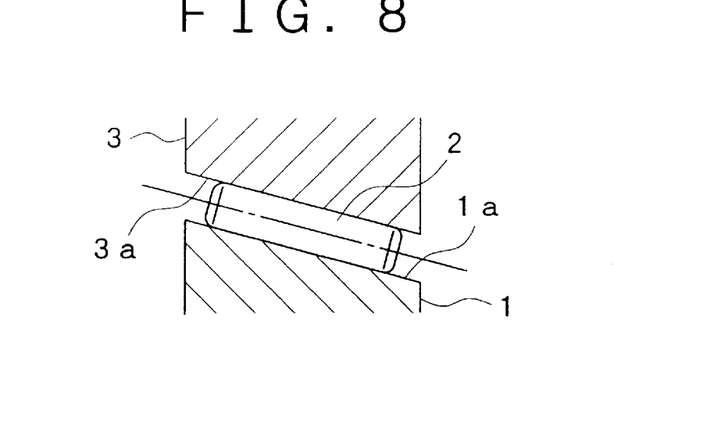
FIG. 8 is a sectional view taken along an arrow line I—I of FIG. 3 in the case of forming each raceway surface and an outer peripheral surface of the roller into straight lines.
Figure 9:
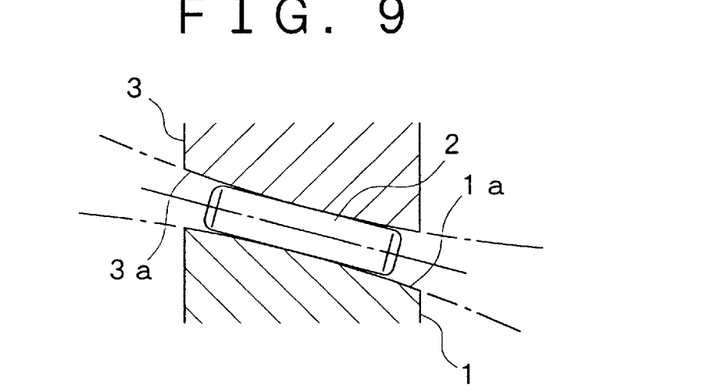
FIG. 9 is a sectional view taken along an arrow line I—I of FIG. 3 in the case of forming each raceway surface into a curved line.
Figure 10:
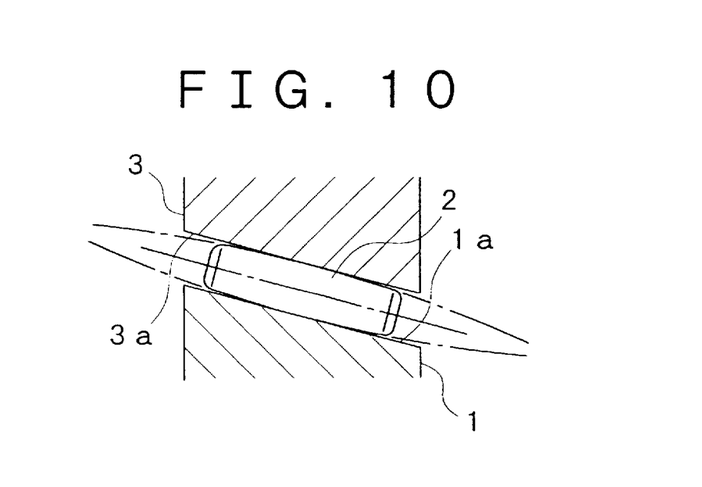
FIG. 10 is a sectional view taken along an arrow line I-I of FIG. 3 in the case of forming an outer peripheral surface of the roller into a curved line.

Moreover, according to the configuration described in the above first embodiment, in the sectional view taken along I—I arrow line shown in FIG. 3, that is, in a cross section including the rolling axis of the roller 2, as shown in FIG. 8, when the inner raceway surface 1a and the outer raceway surface 3a are caused to uniformly contact with the outer peripheral surface of the roller 2 in the axial direction, contact pressures on both ends of the roller 2 in the axial direction become larger than a middle portion thereof in the axial direction. So, as shown in FIG. 9, in a cross section including the rolling axis of the roller 2, the inner raceway surface 1a and the outer raceway surface 3a are formed into a convex curved shape with respect to the outer peripheral surface of each roller 2, and thereby, it is possible to reduce contact pressures on both ends of the roller 2 in the axial direction. Therefore, the curved shape of raceway surfaces 1a and 3a are formed so that a contact pressure of the roller 2 becomes uniform along the axial direction, and thereby, uneven wear of the roller 2 can be reduced. Further, as shown in FIG. 10, in a cross section including the rolling axis of the roller 2, even in the case where the inner raceway surface 1a and the outer raceway surface 3a are formed like a straight line, the outer peripheral surface of the roller 2 is formed in a convex curved line with respect to the raceway surfaces 1a and 3a, and thereby, it is possible to obtain the same effect as described above.

Figure 11:
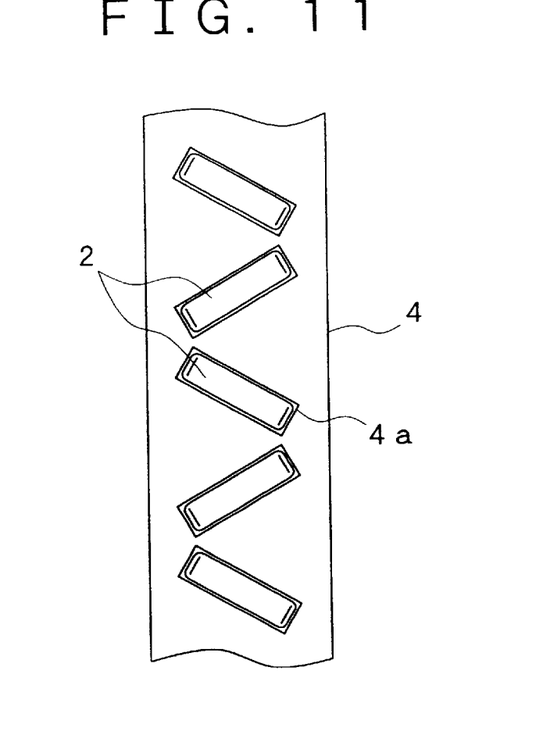
FIG. 11 is a development view showing rollers and a cage according to a second embodiment of the present invention.
Figure 12A:
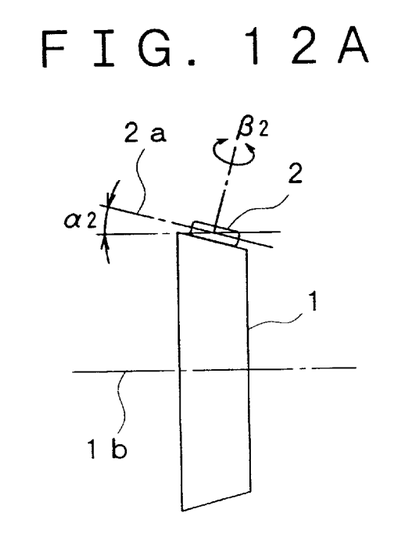
FIG. 12A and FIG. 12B are schematic views showing an inclination angle of the roller.
Figure 12B:
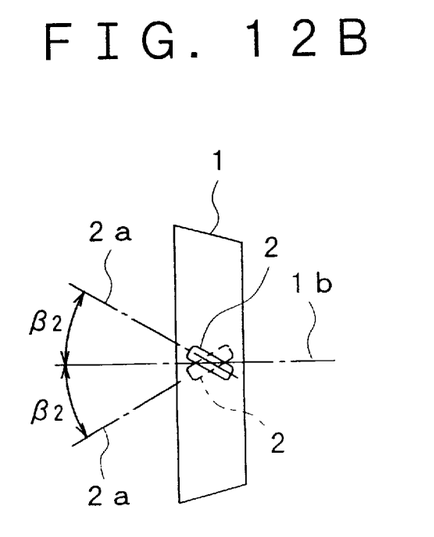
Figure 13:
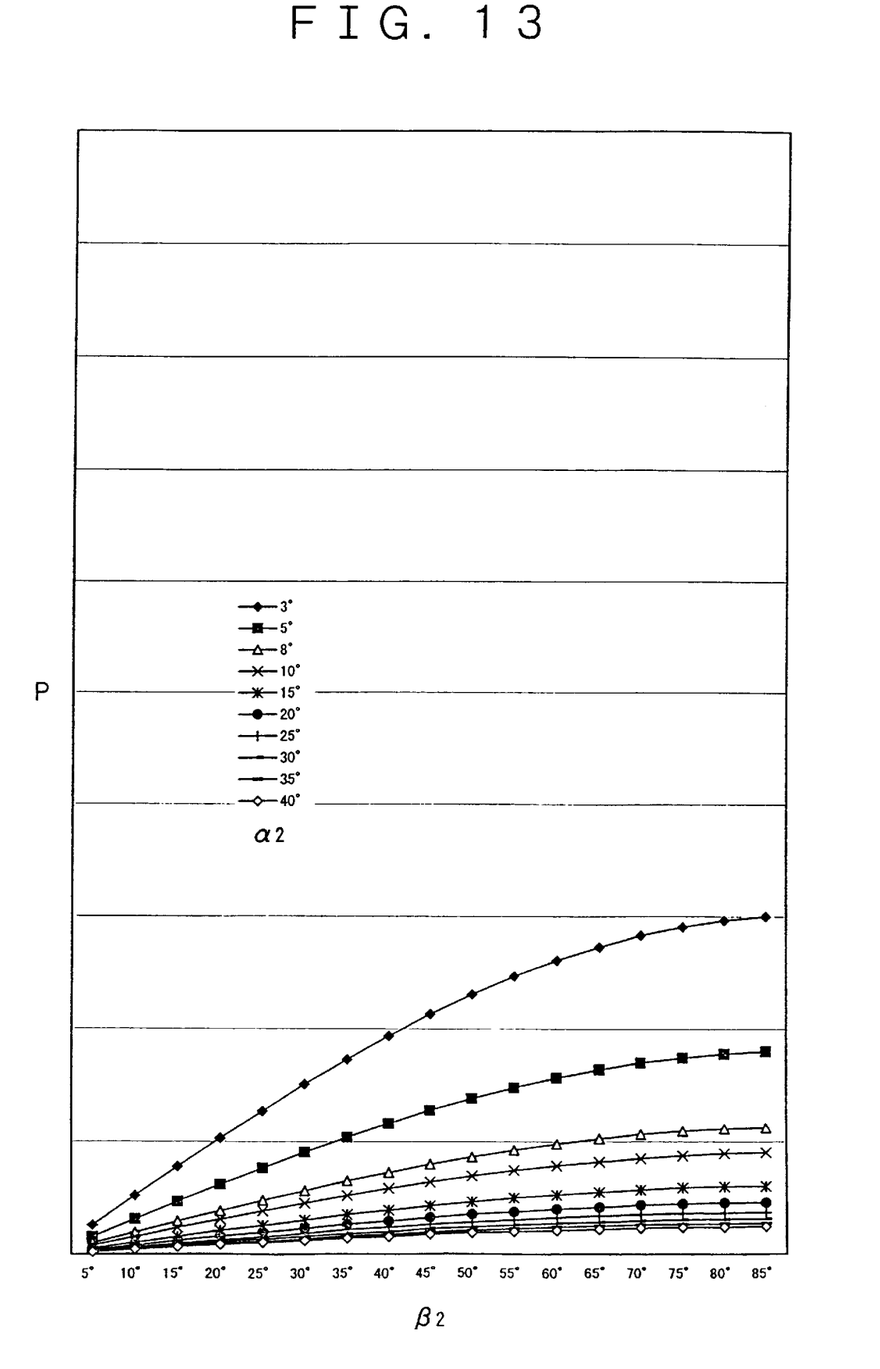
FIG. 13 is a graph showing a relationship between an inclination angle of the roller and a frictional torque.

FIG. 11 to FIG. 13 show a second embodiment of the present invention.

More specifically, in the second embodiment, the rollers 2 are alternately inclined in opposite directions with respect to a plane including the rotational axis of the rotor 1 every the same number. As shown in FIG. 12A, a rolling axis of each roller 2 has a prescribed inclination angle α2 to a rotational axis 1b of the rotor 1a, and the rolling axis has a prescribed inclination angle β2 to a plane including the rotational axis 1b of the rotor 1, as shown in FIG. 12B. In this case, the inclination angle α2 is set to be larger than an angle of 3° and smaller than an angle of 20°, and the inclination angle β2 is set to be larger than an angle of 25° and smaller than an angle of 90°. It is to be noted that the inclination angle β2 is an angle when viewing from a direction perpendicular to the rolling axis 2a of the roller 2.

According to the aforesaid configuration, in the friction resistance generator, a frictional force proportional to a load F in the axial direction can be generated among each roller 2, the rotor 1 and the passive member 3, like the first embodiment. In this case, the rollers 2 are alternately inclined in opposite directions with respect to a plane including the rotational axis of the rotor 1 every the same number; An equal frictional force is generated in any rotational direction of the rotor 1.

In this second embodiment, the applicant has confirmed a relationship between inclination angles α2, β2 and a frictional torque P on the basis of an experiment and theoretical analysis which have been made in a range from 3° to 40° of the inclination angle α2 and in a range from 5° to 85° of the inclination angle β2.

More specifically, as shown in FIG. 13, in any case of the inclination angle α2, when the inclination angle β2 become small, there appears a characteristic such that the frictional torque P uniformly decreases. When the inclination angle a 2 becomes 20° or more, a frictional torque P of a practically effective value or more can not be obtained regardless of magnitude of the inclination angle β2. Further, even in the case where the inclination angle α2 is smaller than 20°, when the inclination angle β2 is 25° or less, a frictional torque P of a practically effective value or more can not be obtained. In addition, the applicant does not actually confirm the case where the inclination angle β2 is more than 85°, but according to the above experimental data, it is presumed that a frictional torque P generated at the inclination angle β2 up to 90° becomes generally equal to the case where the inclination angle β2 is 85°.

Figure 14:
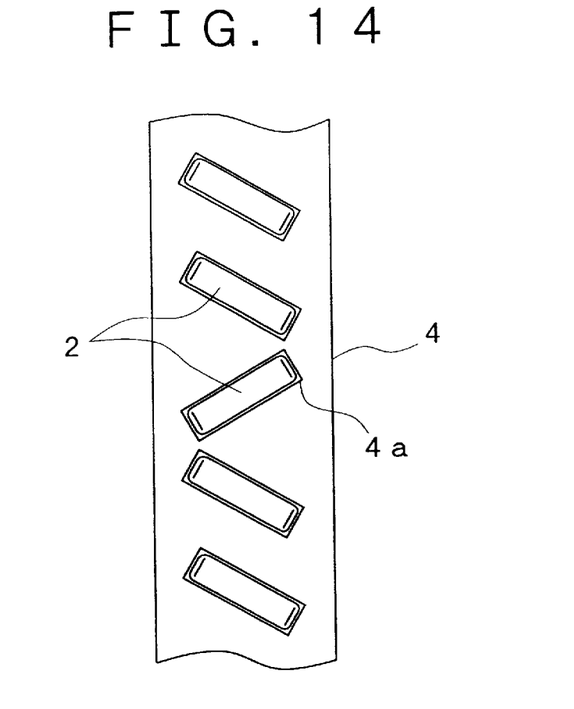
FIG. 14 is a development view showing rollers and a cage according to a modification example of the second embodiment.
Figure 15:
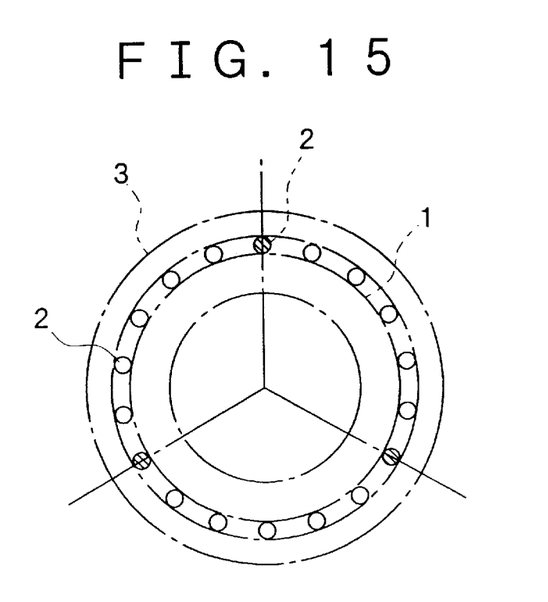
FIG. 15 is a schematic front view showing an arrangement of the rollers.

The above second embodiment has described the case where the rollers 2 are alternately inclined in opposite directions with respect to a plane including the rotational axis of the rotor 1 every the same number. As shown in FIG. 14, however the rollers 2 may be alternately inclined in opposite directions with respect to a plane including the rotational axis of the rotor 1 every different number. In this case, as shown in FIG. 15, the rollers 2 (shown by a slant line) are positioned at least three portions in total at equal intervals in the circumferential direction of the rotor 1, which are inclined to a direction reverse to other rollers 2, and thereby, it is possible to stabilize a rotation of the rotor 1.

What is claimed is:

1. A friction resistance generator comprising:

a rotor rotating on the center of an axis thereof;

a plurality of rollers arranged along a rotational raceway track of the rotor;

a passive member facing the rotor in a radial direction of the rotor through the respective rollers; and a retainer holding the respective rollers arranged at intervals so that the rollers freely roll, wherein rolling axes of the respective rollers are inclined so as to form a prescribed first inclination angle with respect to a rotational axis of the rotor, and the first inclination angle is set to a range larger than 10° and smaller than 20°, and the rolling axes of the rollers are inclined to the identical direction so as to form a prescribed second inclination angle to a plane including the rotational axis of the rotor respectively ,and the second inclination angle is set to a range larger than 25° and smaller than 90°.

2. A friction resistance generator comprising:

a rotor rotating on the center of an axis thereof;

a plurality of rollers arranged along a rotational raceway track of the rotor;

a passive member facing the rotor in a radial direction of the rotor through the respective rollers; and a retainer holding the respective rollers arranged at intervals so that the rollers freely roll, wherein rolling axes of the rollers are inclined so as to form a prescribed first inclination angle with respect to a rotational axis of the rotor, and the first inclination angle is set to a range larger than 3° and smaller than 8°, and the rolling axes of the rollers are inclined in opposite directions every prescribed number so as to form a prescribed second inclination angle to a plane including the rotational axis of the rotor respectively, and the second inclination angle is set to a range larger than 25° and smaller than 90°.

3. The friction resistance generator according to claim 2, wherein the rollers are inclined in opposite directions to each other, with respect to the plane including the rotational axis of the rotor, and are alternately arranged in a circumferential direction of the rotor.

4. The friction resistance generator according to claim 2, wherein the rollers are inclined in opposite directions to each other, with respect to the plane including the rotational axis of the rotor, and are alternately arranged in a circumferential direction of the rotor, and rollers are respectively positioned in at least three portions in total at equal intervals in a circumferential direction of the rotor, and are inclined in a direction opposed to the other rollers.

5. The friction resistance generator according to claim 1, wherein each surface of the rotor and the passive member contacting with each roller is formed in a convex shape with respect to an outer peripheral surface of each roller in a cross section including the rolling axis of the roller.

6. The friction resistance generator according to claim 1, wherein each outer peripheral surface of each roller contacting with the rotor and the passive member is formed in a convex shape with respect to each contact surface of the rotor and the passive member in a cross section including the rolling axis of the roller.

7. The friction resistance generator according to claim 2, wherein each surface of the rotor and the passive member contacting with each roller is formed in a convex shape with respect to an outer peripheral surface of each roller in a cross section including the rolling axis of the roller.

8. The friction resistance generator according to claim 2, wherein each outer peripheral surface of each roller contacting with the rotor and the passive member is formed in a convex shape with respect to each contact surface of the rotor and the passive member in a cross section including the rolling axis of the roller.

\* \* \* \* \*